US009958766B2

(12) United States Patent
Sugiyama

(10) Patent No.: US 9,958,766 B2
(45) Date of Patent: May 1, 2018

(54) LIGHT SOURCE UNIT AND PROJECTOR

(71) Applicant: CASIO COMPUTER CO., LTD., Tokyo (JP)

(72) Inventor: Chihaya Sugiyama, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days. days.

(21) Appl. No.: 15/469,143

(22) Filed: Mar. 24, 2017

(65) Prior Publication Data

US 2017/0363941 A1    Dec. 21, 2017

(30) Foreign Application Priority Data

Jun. 21, 2016 (JP) .................................. 2016-122617
Aug. 31, 2016 (JP) .................................. 2016-168695

(51) Int. Cl.
*G03B 21/20* (2006.01)
*G03B 33/12* (2006.01)
(Continued)

(52) U.S. Cl.
CPC .............. *G03B 21/208* (2013.01); *F21K 9/64* (2016.08); *F21K 9/69* (2016.08); *F21V 5/007* (2013.01);
(Continued)

(58) Field of Classification Search
CPC .. G03B 21/145; G03B 21/204; G03B 21/208; G03B 21/2013; G03B 21/2033; H04N 9/3152; H04N 9/3158; H04N 9/3164
See application file for complete search history.

(56) References Cited

U.S. PATENT DOCUMENTS

2012/0062857 A1* 3/2012 Saitou ...................... G02B 5/22
                                                                    353/98
2013/0100423 A1* 4/2013 Yamagishi et al. .. G03B 21/204
                                                                    353/98
2016/0173837 A1   6/2016 Miyata

FOREIGN PATENT DOCUMENTS

JP    2012-215633 A    11/2012
JP    2015-232677 A    12/2015

OTHER PUBLICATIONS

Japanese Office Action dated Jan. 25, 2018, issued in corresponding Japanese Patent Application No. 2016-168695. (11 pages).

* cited by examiner

*Primary Examiner* — Sultan Chowdhury
(74) *Attorney, Agent, or Firm* — Fitch Even Tabin & Flannery LLP

(57) ABSTRACT

A light source unit according to an aspect of the invention includes a first semiconductor light emitting device disposed centrally and a second semiconductor light emitting device disposed outwards of the first semiconductor light emitting device, the first and second semiconductor light emitting devices emitting lights, and a first collimator lens disposed centrally and a second collimator lens disposed outwards of the first collimator lens, the first and second collimator lenses being disposed so as to correspond to the first and second semiconductor light emitting devices, respectively, on sides of the first and second semiconductor light emitting devices from which the lights are emitted, and a degree at which the light of the first semiconductor light emitting device is collected onto an illuminated surface differs from a degree at which the light of the second semiconductor light emitting device is collected onto the illuminated surface.

20 Claims, 9 Drawing Sheets

(51) Int. Cl.
*F21V 5/00* (2018.01)
*F21V 9/16* (2006.01)
*F21K 9/64* (2016.01)
*F21K 9/69* (2016.01)
*G03B 21/16* (2006.01)
*F21Y 115/30* (2016.01)

(52) U.S. Cl.
CPC .............. *F21V 9/16* (2013.01); *G03B 21/204* (2013.01); *G03B 33/12* (2013.01); *F21Y 2115/30* (2016.08); *G03B 21/16* (2013.01); *G03B 21/2066* (2013.01)

LIGHT SOURCE UNIT AND PROJECTOR

CROSS-REFERENCE TO RELATED APPLICATIONS

This application is based upon and claims the benefit of priority under 35 USC 119 from Japanese Patent Application No. 2016-122617 filed on Jun. 21, 2016 and Japanese Patent Application No. 2016-168695 filed on Aug. 31, 2016, the entire disclosures of which, including the specifications, claims, drawings and abstracts, are incorporated herein by reference.

BACKGROUND OF THE INVENTION

Field of the Invention

The present invention relates to a light source unit and a projector having this light source unit.

Description of the Related Art

In these days, data projectors are used on many occasions as image projection systems which project a screen of a personal computer and a video image, as well as images based on image data stored on a memory card onto a screen. These projectors are such that light emitted from a light source is collected onto a micromirror display device called a digital micromirror device (DMD) or a liquid crystal panel, so that a color image is projected onto a screen for display thereon.

The application of these projectors is expanded from a presentation on a business scene to a domestic use in association with the propagation of personal computers and video equipment such as DVD players. Conventionally, in the mainstream of these projectors, high-intensity discharge lamps have been used as a light source. In recent years, however, there have been made developments of various types of projectors which use, as a light source, a plurality of semiconductor light emitting devices such as laser diodes and which include a fluorescence plate which uses the semiconductor light emitting devices as an excitation light source.

A light source unit disclosed in Japanese Unexamined Patent Publication No. 2015-232677 (Patent Literature 1) has an excitation light shining device in which a plurality of blue laser diodes are arranged into a matrix configuration and a fluorescence plate on which fluorescence material is formed. Light in the blue wavelength range which is emitted from the blue laser diodes is collected in the position where the fluorescence material is formed. The fluorescence material is excited by the light in the blue wavelength range to emit light in the green wavelength range.

In general, distances from the plurality of blue laser diodes which are disposed on the excitation light shining device to the fluorescence material on the fluorescence plate differ due to the positions of the blue laser diodes so disposed and the characteristics a light guiding member. There may be situations where in the event that lengths of optical paths of lights in the blue wavelength range which are emitted from the blue laser diodes differ, the lights shone onto the fluorescence material produce different shapes thereon depending upon the individual blue laser diodes from which the lights are originated. In the case of a plurality of blue laser diodes being used as an excitation light source as in Patent Literature 1 above, a distribution of the lights in the blue wavelength range which are superposed on one another on the fluorescence plate may become uneven in an effective range of the fluorescence plate; for example, the illuminated intensity becomes high at the center of the fluorescence plate. When the illuminated intensity becomes too high, the fluorescence efficiency of the fluorescence material is deteriorated, and in the event that the illuminated distribution is uneven, the irregularity in luminance tends to be produced easily.

SUMMARY OF THE INVENTION

The invention has been made in view of the situations described above, and an object thereof is to provide a light source unit which emits uniform light which can provide high utilization efficiency and a projector which includes this light source unit.

According to an aspect of the invention, there is provided a light source unit including:

a first semiconductor light emitting device which is disposed centrally and a second semiconductor light emitting device which is disposed outwards of the first semiconductor light emitting device, the first semiconductor light emitting device and the second semiconductor light emitting device emitting lights; and a first collimator lens which is disposed centrally and a second collimator lens which is disposed outwards of the first collimator lens, the first collimator lens and the second collimator lens being disposed so as to correspond to the first semiconductor light emitting device and the second semiconductor light emitting device, respectively, on sides of the first semiconductor light emitting device and the second semiconductor light emitting device from which the lights are emitted, wherein a degree at which the light of the first semiconductor light emitting device is collected onto an illuminated surface differs from a degree at which the light of the second semiconductor light emitting device is collected onto the illuminated surface.

According to another aspect of the invention, there is provided a projector including:

the light source unit described above;

a display device onto which light source light is shone from the light source unit to thereby form image light;

a projection-side optical system which projects the image light emitted from the display device onto a screen; and a projector control unit which controls the display device and the light source unit.

DETAILED DESCRIPTION OF THE PREFERRED EMBODIMENTS

First Embodiment

Figure 1:
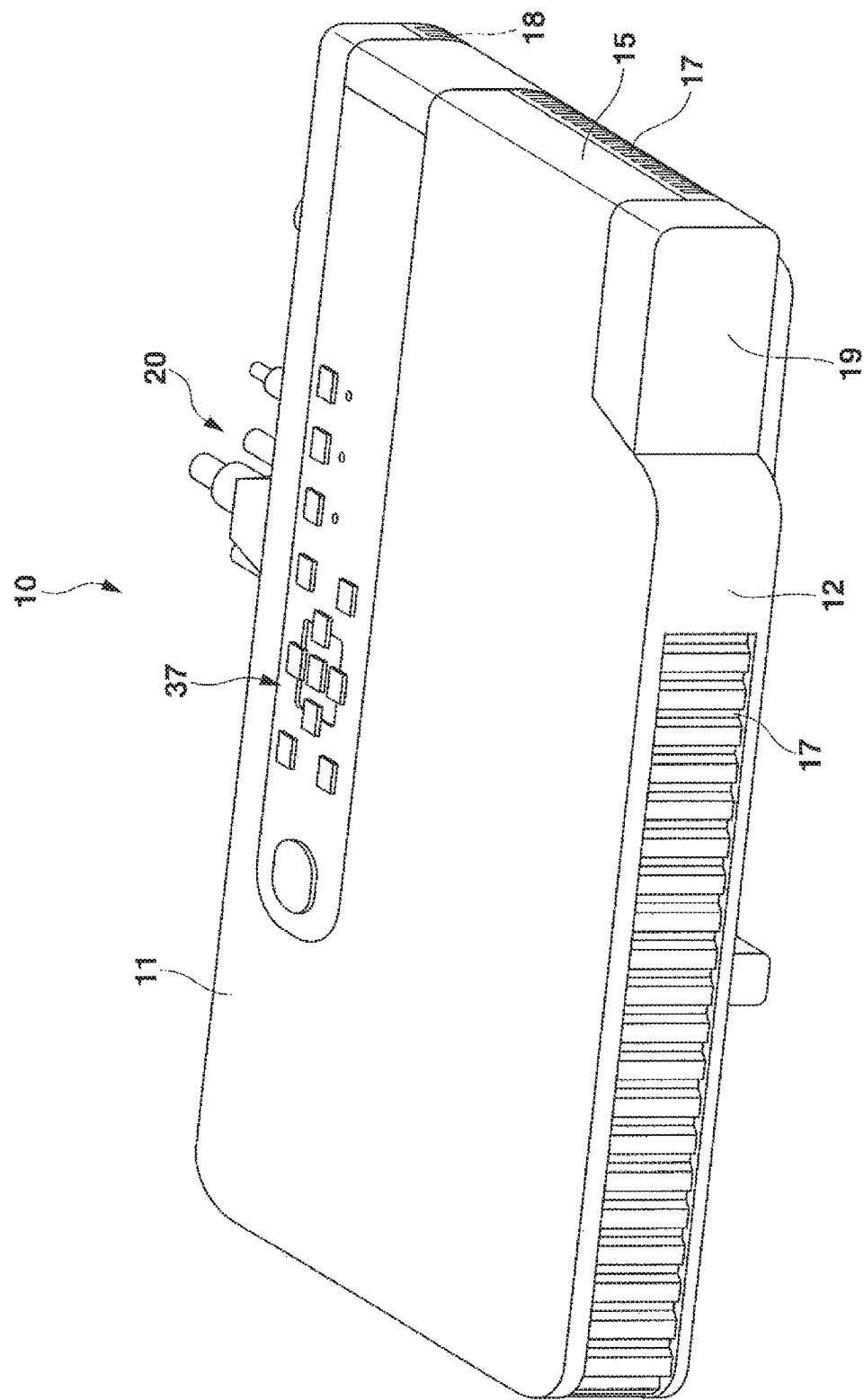
FIG. 1 is an external perspective view showing a projector according to a first embodiment of the invention.

Hereinafter, a first embodiment of the invention will be described by the use of the drawings. FIG. 1 is an external perspective view of a projector 10. In this embodiment, when referred to in relation to the projector 10, left and right denote, respectively, left and right in relation to the projecting direction of the projector 10, and when referred to in relation to the projector 10, front and rear denote, respectively, front and rear in relation to the direction of a screen and a traveling direction of a pencil of light that is emitted from the projector 10 towards the screen.

As is shown in FIG. 1, the projector 10 has a substantially rectangular parallelepiped shape. The projector 10 has a lens cover 19 which covers a projection port which is disposed at a side of a front panel 12 which is referred to as a front side panel of a casing of the projector 10. Additionally, a plurality of inside air outlet holes 17 are provided in the front panel 12. Further, although not shown, the projector 10 includes an IR reception unit which receives a control signal from a remote controller.

In addition, a keys/indicators unit 37 is provided on an upper panel 11 of the casing. Disposed on this keys/indicators unit 37 are keys and indicators which include a power supply switch key, a power indicator, a projection switch key, an overheat indicator, and the like. The power indicator informs whether a power supply is on or off. The projection switch key switches on or off the projection by the projector 10. The overheat indicator informs of an overheat condition occurring in a light source unit, a display device, a control unit or the like when they really overheat.

Further, various types of terminals (groups) 20 which include an input/output connector unit, a power supply adaptor plug and the like are provided in a back side or a back panel of the casing. The input/output connector unit includes a USB terminal, a video signal input D-SUB terminal into which analog RGB video signals are inputted, an S terminal, an RCA terminal, a voice output terminal and the like which are provided on the back panel. Additionally, a plurality of outside air inlet holes are formed in the back panel. A plurality of inside air outlet holes 17 are formed individually in a right panel, not shown, which constitutes a side panel of the casing and a left panel 15 which constitutes a side panel shown in FIG. 1. In addition, outside air inlet holes 18 are also formed in a corner portion formed between the left panel 15 and the back panel and in the back panel.

Figure 2:
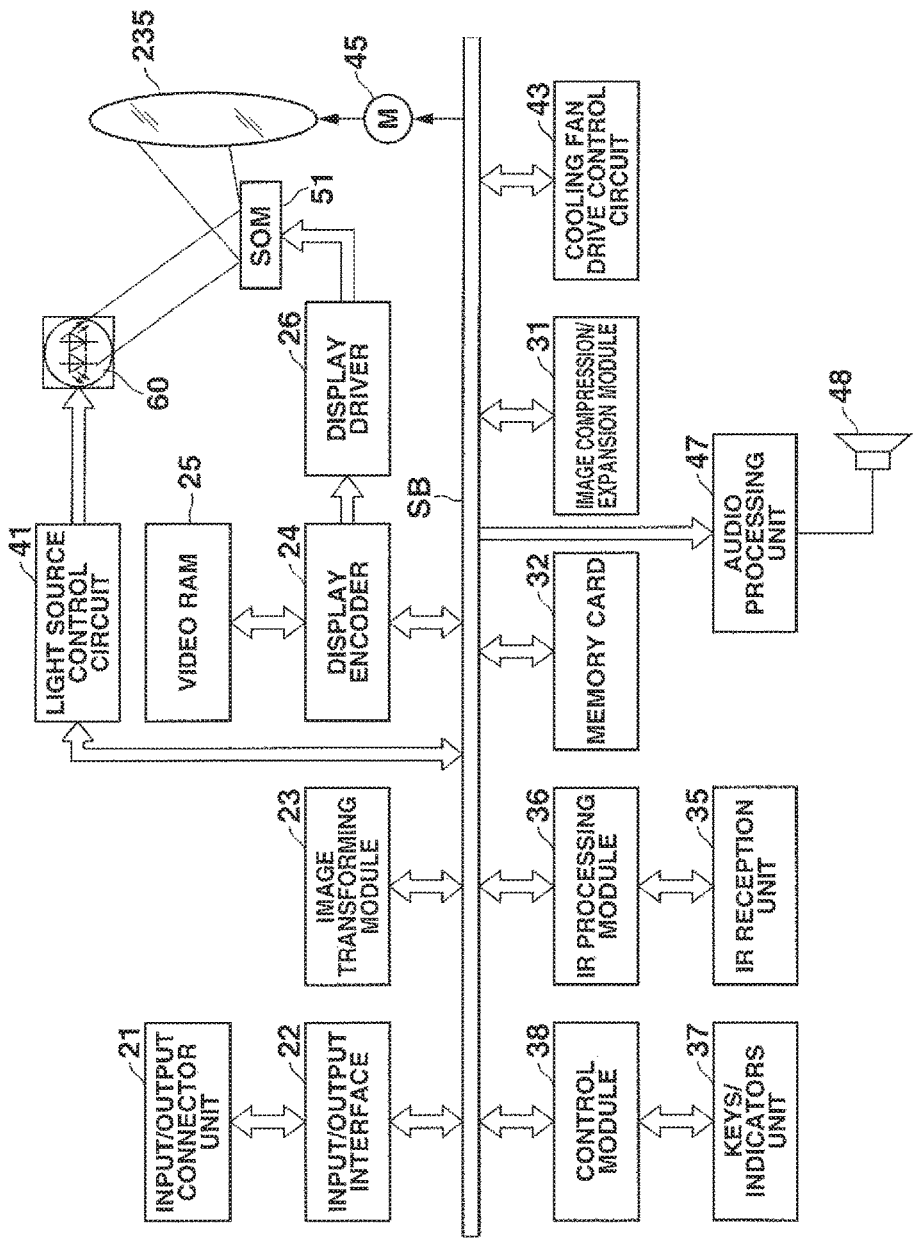
FIG. 2 is a block diagram showing functional blocks of the projector according to the first embodiment of the invention.

Next, a projector control unit of the projector 10 will be described by the use of a functional block diagram shown in FIG. 2. The projector control unit includes a control module 38, an input/output interface 22, an image transforming module 23, a display encoder 24, a display driver 26 and the like.

This control module 38 governs the control of respective operations of circuitries within the projector 10 and is made up of a CPU, a ROM which stores in a fixed fashion operation programs of various types of settings, a RAM which is used as a working memory and the like.

Image signals of various standards which are inputted from the input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display driver 26.

The display driver 26 functions as a display device control module. The display driver 26 drives a display device 51, which is a spatial optical modulator (SOM), at an appropriate frame rate in response to the image signal outputted from the display encoder 24.

The projector 10 projects a pencil of light which is emitted from a light source unit 60 onto the display device 51 via a light source-side optical system, whereby an optical image is formed by using reflected light which is reflected by the display device 51. The image so formed is then projected onto a screen for display thereon via a projection-side optical system. In addition, a movable lens group 235 of the projection-side optical system is driven by a lens motor 45 for zooming or focusing.

An image compression/expansion unit 31 performs a recording operation in which a luminance signal and a color difference signal of an image signal are data compressed through ADCT and Huffman coding processes and the compressed data is sequentially written on a memory card 32 which is configured as a detachable recording medium.

Further, when the projector 10 is in a reproducing mode, the image compression/expansion unit 31 reads out image data recorded on the memory card 32 and expands individual image data which make up a series of dynamic images frame by frame. Then, the image compression/expansion unit 31 outputs the image data to the display encoder 24 via the image transforming module 23 so as to enable the display of dynamic images and the like based on the image data stored on the memory card 32.

Then, operation signals generated at the keys/indicators unit 37 which includes the main keys and indicators which are provided on the upper panel 11 of the casing are sent out directly to the control module 38. Key operation signals from the remote controller are received by the IR reception unit 35, and a code signal demodulated at an IR processing unit 36 is outputted to the control module 38.

An audio processing unit 47 is connected to the control module 38 via the system bus (SB). This audio processing unit 47 includes a circuitry for a sound source such as a PCM sound source or the like. When the projector 10 is in a projection mode and the reproducing mode, the audio processing unit 47 converts audio data into analog signals and drives a speaker 48 to output loudly sound or voice based on the audio data.

The control module 38 controls a light source control circuit 41 which is configured as a light source control unit. The light source control circuit 41 controls individually the operations of an excitation light source and a red light source device so as to emit lights in the red, green and blue wavelength ranges, respectively, at predetermined timings so that the lights in the specified wavelength ranges which are required in producing an image are emitted from the light source unit 60.

Further, the control module 38 causes a cooling fan drive control circuit 43 to detect temperatures through a plurality of temperature sensors which are provided in the light source unit 60 so as to control the rotating speeds of cooling fans based on the results of the temperature detections. Additionally, the control module 38 also causes the cooling fan drive control circuit 43 to keep the cooling fans rotating by use of a timer even after the power supply to the main body of the projector 10 is switched off. Alternatively, the control module 38 causes the cooling fan drive control circuit 43 to cut off the power supply to the main body of the projector 10 depending upon the results of the temperature detections by the temperature sensors.

Figure 3:
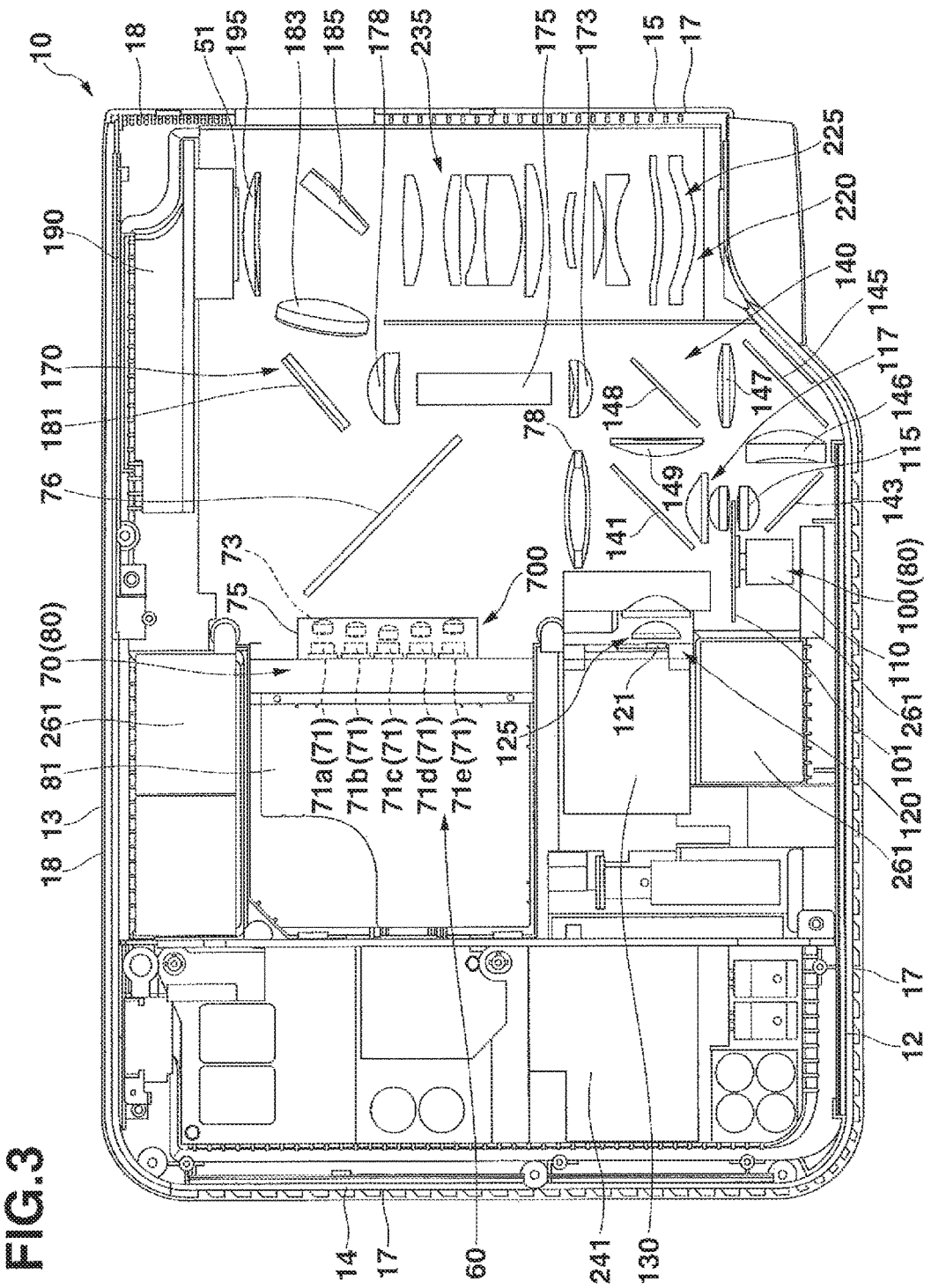
FIG. 3 is a schematic plan view showing an internal construction of the projector according to the first embodiment of the invention.

Next, an internal construction of the projector 10 will be described. FIG. 3 is a schematic plan view showing the internal construction of the projector 10. The projector 10 includes a control circuit board 241 which is provided near the right panel 14. This control circuit board 241 includes a power supply circuit block and a light source control block. The projector 10 includes the light source unit 60 which is provided to the left of the control circuit board 241, that is, at a substantially central portion of the casing of the projector 10. Further, the projector 10 includes a light source-side optical system 170 and a projection-side optical system 220 which are disposed between the light source unit 60 and the left panel 15.

The light source unit 60 includes a red light source device 120 which is a light source of light in the red wavelength range, a green light source device 80 which is a light source of light in the green wavelength range, and an excitation light shining device 70 which is not only a light source of light in the blue wavelength range and but also an excitation light source. The green light source device 80 is made up of the excitation light shining device 70 and a fluorescence plate device 100. The light source unit 60 also includes a light guiding optical system 140 which causes a pencil of light in the red wavelength range to join to a pencil of light in the green wavelength range and a pencil of light in the blue wavelength range, so that the pencils of light in the red, green and blue wavelength ranges are guided onto the same optical path to travel in the same direction.

The excitation light shining device 170 is disposed in a substantially central position in a left-and-right or transverse direction of the casing of the projector 10. The excitation light shining device 70 includes a plurality of semiconductor light emitting devices which are disposed so that their optical axes become parallel to the back panel 13. In this embodiment, the semiconductor light emitting devices are blue laser diodes 71 which emit light in the blue wavelength range. The blue laser diodes 71 are disposed substantially parallel to the right panel 14. Collimator lenses 73 are disposed individually on the optical axes of the blue laser diodes 71. The collimator lenses 73 each enhance the directivity of light emitted from each of the blue laser diodes 71 and convert the light into parallel light. The blue laser diodes 71 and the collimator lenses 73 are fixed in place in a fixing holder 75.

The excitation light shining device 70 includes a reflecting mirror 76 which turns axes of lights emitted individually from the blue laser diodes 71 through 90 degrees in the direction of the front panel 12, a collective lens 78 which collects the lights emitted from the blue laser diodes 71 and reflected by the reflecting mirror 76, and a heat sink 81 which is disposed between the blue laser diodes 71 and the right panel 14. Additionally, a cooling fan 261 is disposed between the heat sink 81 and the back panel 13. The blue laser diodes 71 are cooled by the cooling fan 261 and the heat sink 81.

The red light source device 120 includes a red light source 121 which is disposed so that an optical axis thereof becomes parallel to the blue laser diodes 71 and a group of collective lenses 125 which collects light emitted from the red light source 121. This red light source 121 is a red light emitting diode which is a semiconductor light emitting device which emits light in the red wavelength range. The red light source device 120 is disposed so that an axis of light in the red wavelength range emitted from the red light source device 120 intersects an axis of light in the green wavelength range which is emitted from the fluorescence plate 101. In addition, the red light source device 120 includes a heat sink 130 which is provided on aside of the red light source 121 which faces the right panel 14. A cooling fan 261 is disposed between the heat sink 130 and the front panel 12, and the red light source 121 is cooled by this cooling fan 261 and the heat sink 130.

The fluorescence plate device 100 which makes up the green light source device 80 includes a fluorescence plate 101 which takes the form of a fluorescence wheel and which is disposed so as to intersect axes of lights emitted from the excitation light shining device 70 at right angles, a motor 110 which rotationally drives the fluorescence plate 101, a group of collective lenses 117 which collects pencils of excitation light emitted from the excitation light shining device 70 onto the fluorescence plate 101, and a collective lens 115 which collects a pencil of light emitted from the fluorescence plate 101 in the direction of the front panel 12.

Figure 4:
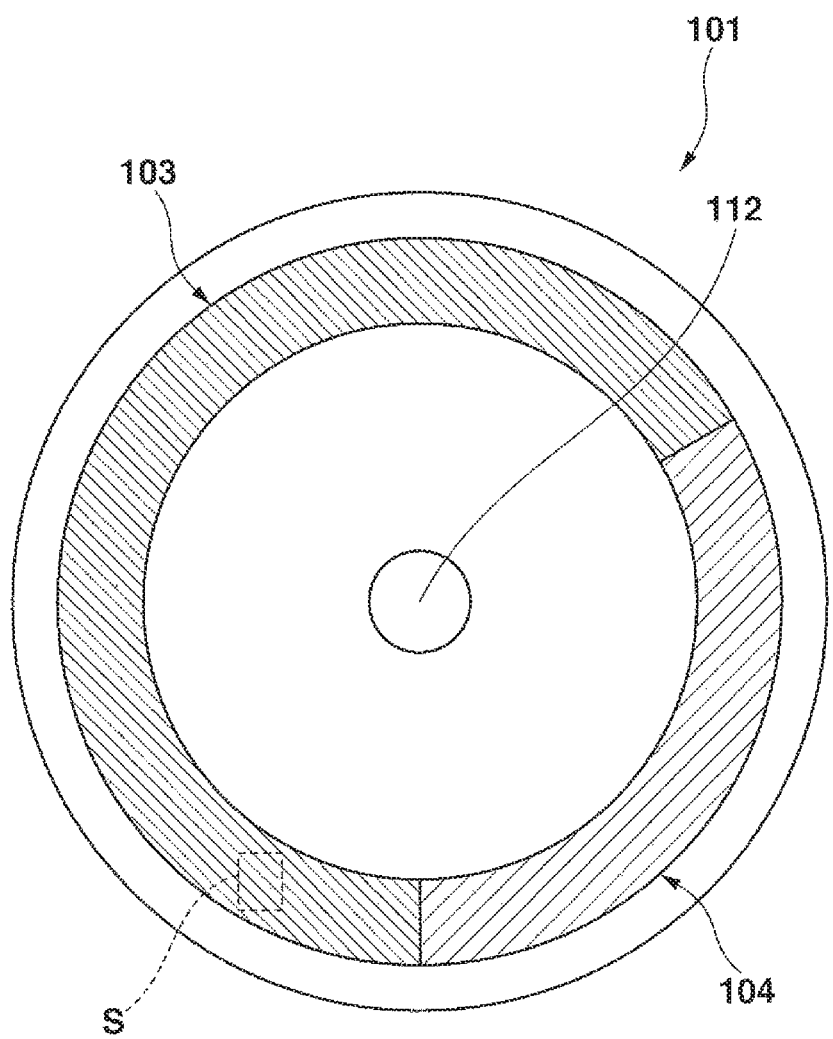
FIG. 4 is a schematic plan view of a fluorescence plate according to the first embodiment of the invention.

Here, the fluorescence plate 101 will be described. FIG. 4 is a schematic plan view of the fluorescence plate 101. This diagram shows a view of a side of the fluorescence plate 110 which lies to face the group of collective lenses 117. The fluorescence plate 101 is formed into a circular disc and is driven to rotate about a motor shaft 112 by the motor 110. A fluorescence light emitting area 103 and a diffuse transmission area 104 are provided on the fluorescence plate 101 so as to be aligned in a circumferential direction in an end-to-end fashion. The fluorescence light emitting area 103 and the diffuse transmission area 104 are each formed in a substantially constant width in relation to a radial direction. The fluorescence light emitting area 103 receives lights in the blue wavelength range emitted from the blue laser diodes 71 as excitation light, whereby excited fluorescence light in the green wavelength range is emitted from the fluorescence light emitting area 103. The diffuse transmission area 104 diffuse transmits lights emitted from the blue laser diodes 71. The blue lights that are diffuse transmitted through the diffuse transmission area 104 are emitted as light in the blue wavelength range of the light source 60.

Returning to FIG. 3, a cooling fan 261 is disposed between the motor 110 and the front panel 12. The fluorescence plate device 100 is cooled by this cooling fan 261.

The light guiding optical system 140 has a first dichroic mirror 141, a collective lens 149, a second dichroic mirror 148, a first reflecting mirror 143, a collective lens 146, a second reflecting mirror 145, and a collective lens 147. The first dichroic mirror 141 is disposed in a position where lights in the blue wavelength range emitted from the excitation light shining device 70 and light in the green wavelength range emitted from the green wavelength range intersect light in the red wavelength range emitted from the red light source 120. The first dichroic mirror 141 transmits light in the blue wavelength range and light in the red wavelength rage and reflects light in the green wavelength range. Thus, an axis of light in the green wavelength range emitted from the fluorescence plate 101 is turned through 90 degrees in the direction of the left panel 15 by the first dichroic mirror 141.

The collective lens 149 is disposed on a side of the first dichroic mirror 141 which faces the left panel 15. Further, the second dichroic mirror 148 is disposed on a side of the collective lens 149 which faces the left panel 15 and on a side of the collective lens 147 which faces the back panel 13. The second dichroic mirror 148 reflects light in the red wavelength range and light in the green wavelength range and transmits light in the blue wavelength range. A collective lens 173 is disposed on aside of the second dichroic mirror 148 which faces the back panel 13.

An axis of light in the red wavelength range which passes through the first dichroic mirror coincides with an axis of light in the green wavelength range which is reflected by the first dichroic mirror 141. Light in the red wavelength range which passes through the first dichroic mirror 141 and light in the green wavelength range which is reflected by the first dichroic mirror 141 both enter the collective lens 149. Then, the light in the red wavelength range and the light in the green wavelength range which pass through the collective lens 149 are reflected by the second dichroic mirror 148 to enter the collective lens 173.

The first reflecting mirror 143 is disposed on an axis of light in the blue wavelength range which passes through the fluorescence plate 101 and between the collective lens 115 and the front panel 12. The first reflecting mirror 143 reflects light in the blue wavelength range to thereby turn an axis of the light in the blue wavelength range through 90 degrees in the direction of the left panel 15. The collective lens 146 is disposed on a side of the first reflecting mirror 143 which faces the left panel 15. The second reflecting mirror 145 is disposed on a side of the collective lens 146 which faces the left panel 15.

The collective lens 147 is disposed on a side of the second reflecting mirror 145 which faces the back panel 13. The second reflecting mirror 145 turns an axis of light in the blue wavelength range which is reflected by the first reflecting mirror 143 and which is then incident thereon via the collective lens 146 through 90 degrees in the direction of the back panel 13. The light in the blue wavelength range which is reflected by the second reflecting mirror 145 passes through the second dichroic mirror 148 by way of the collective lens 147 and is then incident on the collective lens 173.

In this way, the pencils of light in the red, green and blue wavelength ranges are collected onto the same optical path by the light guiding optical system 140. The pencils of light in the red, green and blue wavelength ranges which are guided by the light guiding optical system 140 are collected by the collective lens 173 of the light source-side optical system 170.

The light source-side optical system 170 is made up of the collective lens 173, a light tunnel 175, a collective lens 178, a light axis turning mirror 181, a collective lens 183, a light shining mirror 185, and a condenser lens 195. The condenser lens 195 directs image light emitted from the display device 51 which is disposed on a side of the condenser lens 195 which faces the back panel 13 towards the projection-side optical system 220, and therefore, the condenser lens 195 is also regarded as making up part of the projection-side optical system 220.

The pencils of light in the red, green and blue wavelength ranges are incident on an incidence port of the light tunnel 175 of the light source-side optical system 170. The pencils of light which enter the light tunnel 175 are changed into pencils of light whose intensities are uniformly distributed across the widths of the beams as they travel down this light tunnel 175.

The light axis turning mirror 181 is disposed on an optical axis of the light tunnel 175 a side of the light tunnel 175 which faces the back panel 13 via the collective lens 178. The pencils of light which exit from an exit port of the light tunnel 175 are collected at the collective lens 178, whereafter axes of the pencils of light are turned towards the left panel 15 by the light axis turning mirror 181.

The pencils of light which are reflected by the light axis turning mirror 181 are collected by the collective lens 183 and are then shone onto the display device 51 at a predetermined angle by way of the condenser lens 195 by the light shining mirror 185. A heat sink 190 is provided on a side of the back panel 13, and the display device 51 which is a digital mirror device (DMD) is cooled by this heat sink 190.

The pencils of light which are the light source light shone onto an image forming plane of the display device 51 by the light source-side optical system 170 are reflected by the image forming plane of the display device 51 and are then projected onto a screen as projected light byway of the projection-side optical system 220. The projection-side optical system 220 is made up of the condenser lens 195, the movable lens group 235 and a fixed lens group 225. The fixed lens group 225 is incorporated in a fixed lens barrel. The movable lens group 235 is incorporated in a movable lens barrel and can be moved by the lens motor for zooming and focusing.

By configuring the projector 10 in the way described heretofore, pencils of light in the red, green and blue wavelength ranges are emitted at different timings from the red light source device 120, the fluorescence plate 101 which is being rotated, and the excitation light shining device 70. Then, the pencils of light in the red, green and blue wavelength ranges are allowed to enter the display device 51 by way of the light guiding optical system 140 and the light source-side optical system 170. Due to this, the display device 51 or the DMD of the projector 10 displays red light, green light and blue light according to data in a time sharing fashion to thereby project a color image onto the screen.

Next, the blue laser diodes 71 and the collimator lenses 73 of the excitation light shining device 70 will be described in detail. The blue laser diodes 71a to 71e (71) and the collimator lenses 73 which are shown in FIG. 3 make up a light source array 700 in which the blue laser diodes 71 and the collimator lenses 73 are arranged into a matrix configuration of three rows and five columns. The collimator lenses 73 are disposed on sides of the blue laser diodes 71a to 71e from which lights are emitted in such a manner as to face individually the corresponding blue laser diodes 71a to 71e.

Figure 5:
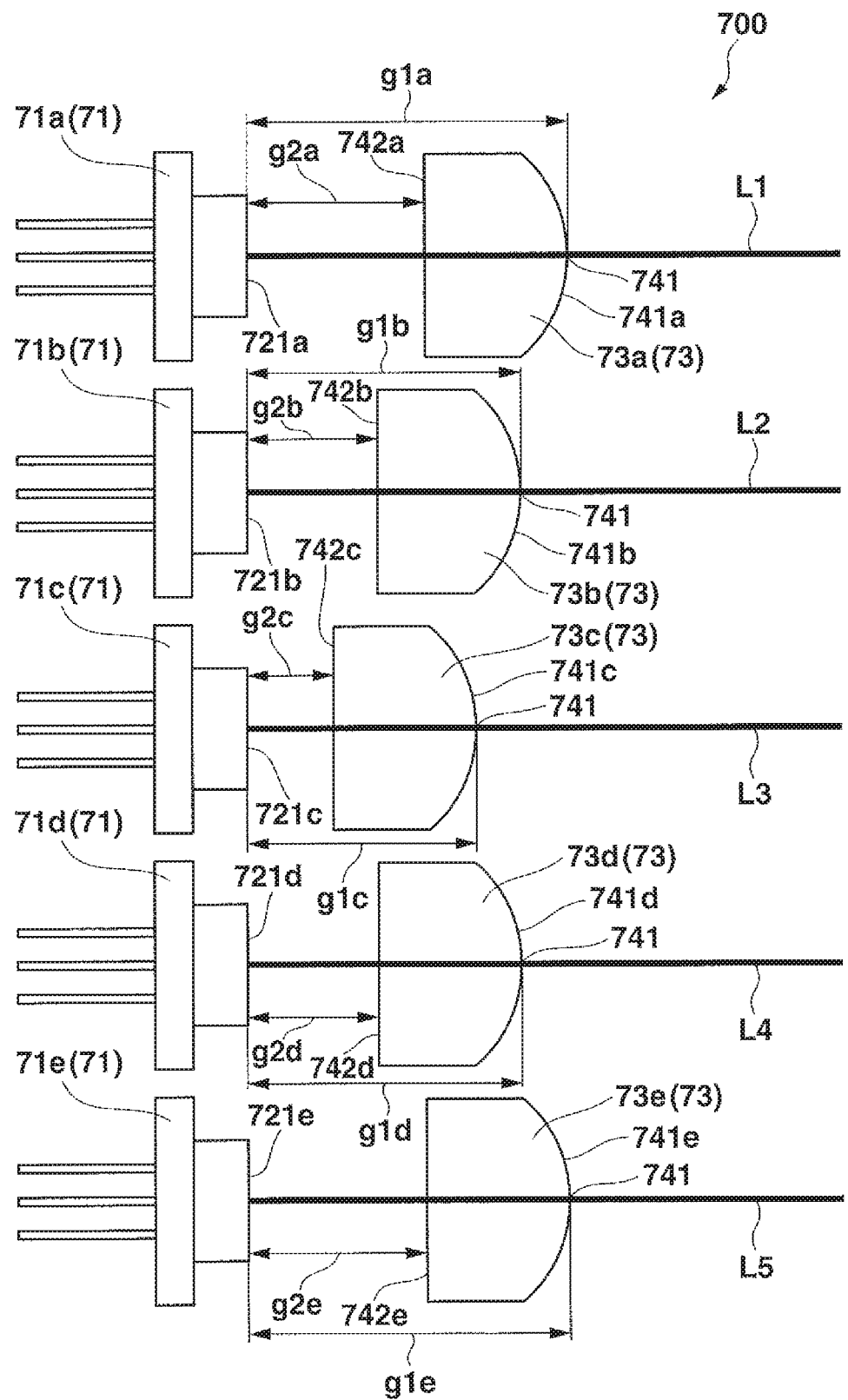
FIG. 5 is a schematic view showing a light source array according to the first embodiment of the invention.

FIG. 5 is a schematic diagram showing the light source array 700. In the following description, the sides of the blue laser diodes 71 from which lights in the blue wavelength range are emitted will be referred to as front sides or the front, and sides of the blue laser diodes 71 which are opposite thereto will be referred to as rear sides or the rear. In the collimator lenses 73a to 73e, incident or incidence surfaces 742a to 742e which lights in the blue wavelength range enter are formed as flat surfaces, while exit surfaces 741a to 741e thereof from which lights in the blue wavelength range exit are formed as convex lenses.

The blue laser diodes 71a to 71e are disposed so that their exit surfaces 721a to 721e are all disposed substantially on the same plane. The collimator lenses 73a to 73e are disposed so that the collimator lenses 73a to 73e are situated farther away from the corresponding blue laser diodes 71a to 71e as they are arranged to be farther away from a center (the collimator lens 73c) towards outer sides of the light source array 700 (the collimator lenses 73a, 73e) along the direction of the row of collimator lenses 73a to 73e. Consequently, the collimator lens (a first collimator lens) 73c which is situated at the center of the light source array 700 along the direction of the row of collimator lenses 73a to 73e is disposed so that its exit surface (a second exit surface) 741c is situated further rearwards than the exit surfaces (fourth exit surfaces) 741a, 741b, 741d, 741e of the outer collimator lenses (second collimator lenses) 73a, 73b, 73d, 73e.

In this way, the light source array 700 is configured so that a distance g1c between the exit surface (a first exit surface) 721c of the blue laser diode (a first semiconductor light emitting device) 71c which is disposed at the center of the whole of the light source array 700 and the exit surface 741c of the collimator lens 73 is shorter than distances g1a, g1b, g1d, g1e between the exit surfaces (third exit surfaces) 721a, 721b, 721d, 721e of the blue laser diodes (second semiconductor light emitting devices) 71a, 71b, 71d, 71e which are disposed on the outer sides of the light source array 700. The distances g1a to g1e denote optical path distances from the exit surfaces 721a to 721e to the exit surfaces 741a to 741e.

In this embodiment, since the collimator lenses 73a to 73e which have substantially the same shape are used, the distances g2a to g2e between the incidence surfaces 742a to 742e of the collimator lenses 73a to 73e and the exit surfaces 721a to 721e of the blue laser diodes 71a to 71e are designed to become longer as the collimator lenses 73a to 73e are arranged to lie closer to the outer sides of the light source array 700.

The collimator lenses 73a to 73e of the light source array 700 are disposed so that axes of lights in the blue wavelength range which are emitted from the corresponding blue laser diodes 71a to 71e substantially coincide with apex portions 741 of the exit surfaces 741a to 741e (that is, optical axes of the collimator lenses 73a to 73e).

In FIG. 5, the collimator lenses 73a, 73b which are situated on one side and the collimator lenses 73d, 73e which are situated on the other side of the light source array 700 are disposed in symmetrical positions with respect to the central collimator lens 73c. However, a configuration may be adopted in which the collimator lenses 73a, 73b, 73d, 73e are not disposed in the symmetrical positions but are disposed in positions which correspond to light collecting positions which are set differently. For example, the collimator lenses 73a to 73e can be disposed so that the distance g1a differs from the distance g1e and the distance g1b differs from the distance g1d, too.

Next, illuminated areas of lights in the blue wavelength range which are emitted from the blue laser diodes 71a to 71e of the light source array 700 will be described. Lights in the blue wavelength range are shone mainly onto an effective range S on the fluorescence light emitting area 103 or the diffuse transmission area 104 of the fluorescence plate 101 which rotates shown in FIG. 4. In this embodiment, the shape of the effective range S is substantially rectangular. However, the effective range S can take any shape in any size as required depending upon the shape of the light guiding member and the shape of the display device 51 which are disposed downstream of the fluorescence plate 101.

Figure 6:
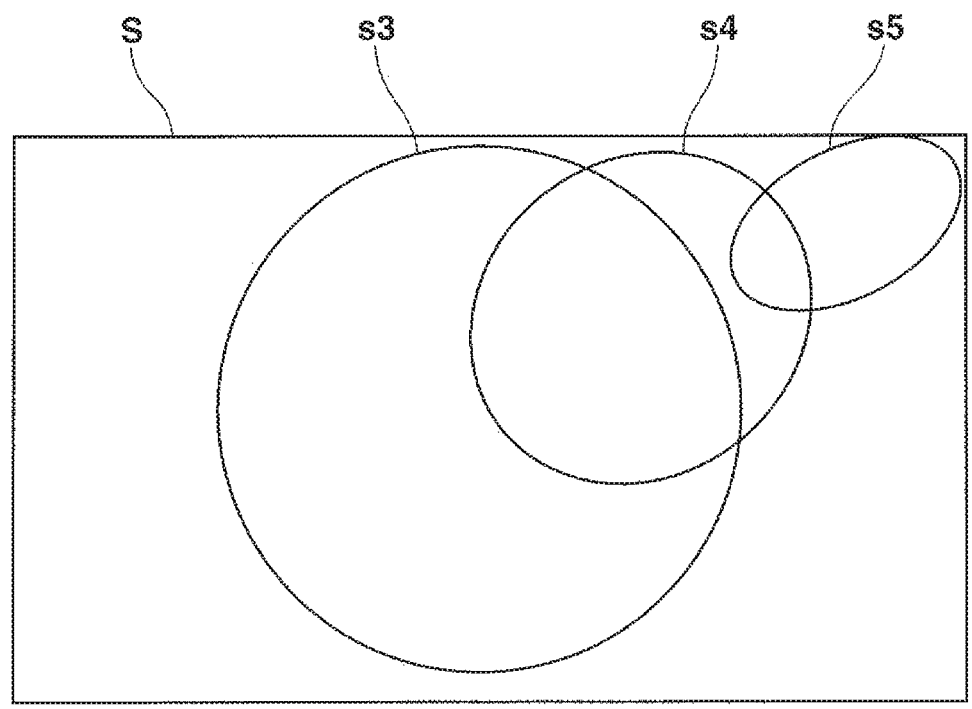
FIG. 6 is a diagram showing illuminated areas of lights in the blue wavelength range which are shone onto an effective range of the fluorescence plate according to the first embodiment of the invention.

FIG. 6 shows illuminated areas s3 to s5 of lights in the blue wavelength range which are shone onto the effective range S. In FIG. 6, the illuminated areas s3 to s5 of lights in the blue wavelength range which are emitted from three blue laser diodes 71c to 71e. The illuminated area s3 which is situated substantially in the center of the effective range S is an area onto which light in the blue wavelength range L3 which is emitted from the blue laser diode 71c shown in FIG. 5 is shone. The illuminated area s4 which is situated slightly outwards of the center of the effective range S is an area onto which light in the blue wavelength range L4 which is emitted from the blue laser diode 71d shown in FIG. 5 is shone. The illuminated area s5 which is situated in a corner portion of the effective range S is an area onto which light in the blue wavelength range L5 which is emitted from the blue laser diode 71e shown in FIG. 5 is shone.

Focal positions of lights in the blue wavelength range are formed in positions lying farther away from the blue laser diodes 71a to 71e as the distances g1a to g1e from the exit surfaces 721a to 721e of the blue laser diodes 71a to 71e to the exit surfaces 741a to 741e of the collimator lenses 73a to 73e shown in FIG. 5 become longer. Thus, in the event that the collimator lens 71e which emits light in the blue wavelength range whose focal position is formed farthest in FIG. 5 is disposed so that the focal position of light in the blue wavelength range L5 emitted therefrom is formed near the illuminated surface of the fluorescence light emitting area 103 or the diffuse transmission area 104 shown in FIG. 4, focal positions of lights in the blue wavelength range which are emitted from the blue laser diode 71c and the blue laser diode 71d come to lie closer to the effective range S shown in FIG. 6 in front thereof in the order of the blue laser diode 71d and the blue laser diode 71c. Due to this, areas of the illuminated areas s3 to s5 are formed so as to become narrower sequentially from the illuminated area s3 to the illuminated area s5 in the order of the illuminated area s3 of the light in the blue wavelength range L3 emitted from the blue laser diode 71c, the illuminated area s4 of the light in the blue wavelength range L4 emitted from the blue laser diode 71d and the illuminated area s5 of the light in the blue wavelength range L5 emitted from of the blue laser diode 71e.

Although the respective illuminated areas s3 to s5 of the lights in the blue wavelength range L3 to L5 overlap partially one another, it is also possible to prevent the illuminated areas s3 to s5 from overlapping partially one another by adjusting the positions of the outer collimator lenses 73d, 73e so as to change the distances g1d, g1e. In this way, by shining lights in the blue wavelength range onto positions within the effective range S, the light in the blue wavelength range so shone can be made use of efficiently as excitation light for the fluorescence light emitting area 103.

As has been described heretofore, with the light source unit 60 of this embodiment, the illuminated area in the effective range S on the fluorescence light emitting area 103 or the diffuse transmission area 104 can be determined to an appropriate size by causing the positions of the collimator lenses 73 to differ with respect to the direction in which lights in the blue wavelength range are emitted from the blue laser diodes 71.

In this way, the illuminated area of the light in the blue wavelength range shone onto the vicinity of the center of the effective range S is widened while the illuminated area of the light in the blue wavelength range shone onto the end portion or the corner portion of the effective range S is narrowed, whereby light whose intensity is uniformly distributed can be shone onto the effective range S as a whole as excitation light.

Figure 7:
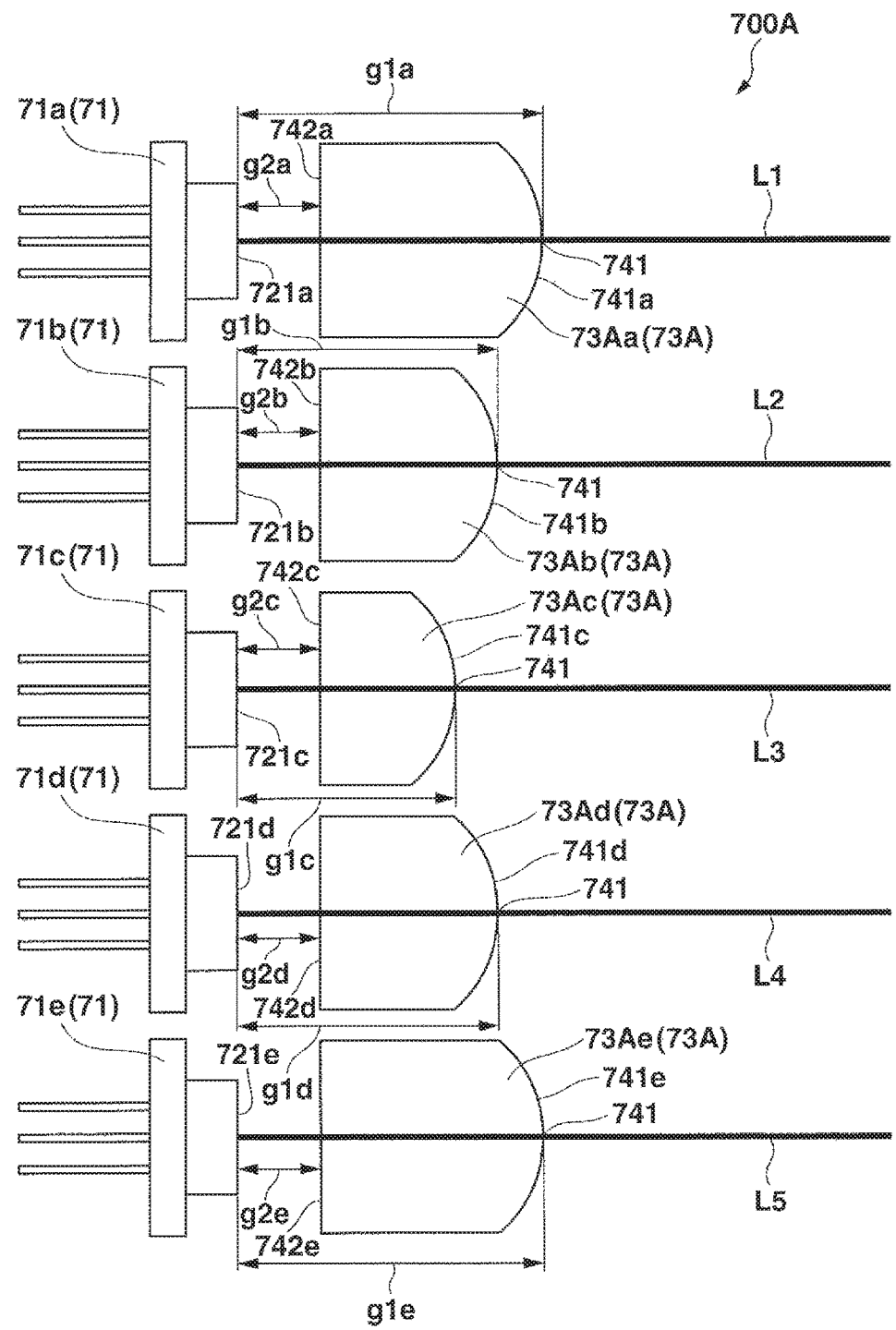
FIG. 7 is a schematic view showing a first modified example made to the light source array according to the invention.

Next, a modified example of this embodiment will be described. FIG. 7 is a schematic view showing a light source array 700A according to a first modified example. In the first modified example, a light source unit 60 includes collimator lenses 73A having different shapes in place of the collimator lenses 73 of the light source array 700.

In collimator lenses 73Aa to 73Ae (73A), incidence surfaces 742a to 742e which lights in the blue wavelength range enter are formed as flat surfaces, while exit surfaces 741a to 741e are formed as convex lenses.

The collimator lenses 73Aa to 73Ae are formed so as to be longer in a direction in which lights in the blue wavelength range are emitted therefrom as the collimator lenses 73Aa to 73Ae are arranged so as to be farther away from a center (the collimator lens 73Ac) towards outer sides (the collimator lenses 73Aa, 73Ae) of the light source array 700A along the direction of the row of collimator lenses 73Aa to 73Ae. Namely, the collimator lenses 73Aa to 73Ae are formed so as to be thicker as the collimator lenses 73Aa to 73Ae are arranged so as to be farther away from the center (the collimator lens 73Ac) towards the outer sides (the collimator lenses 73Aa, 73Ae) of the light source array 700A along the direction of the row of collimator lenses 73Aa to 73Ae. In addition, the collimator lenses 73Aa to 73Ae are disposed so that the incidence surfaces 742a to 742e are positioned substantially on the same plane.

Consequently, as with the light source array 700, the light source array 700A is configured so that a distance g1c between an exit surface 721c of a blue laser diode 71c which is situated at a center of the light source array 700A in relation to the direction of the row of blue laser diodes and the exit surface 741c of the corresponding collimator lens (a first collimator lens) 73Ac is shorter than distances g1a, g1b, g1d, g1e between exit surfaces 721a, 721b, 721d, 721e of blue laser diodes 71a, 71b, 71d, 71e which are disposed on the outer sides of the light source array 700A and the exit surfaces 741a, 741b, 741d, 741e of the corresponding collimator lenses (second collimator lenses) 73Aa, 73Ab, 73Ad, 73Ae.

In addition, distances g2a to g2e from the exit surfaces 721a to 721e of the blue laser diodes 71a to 71e to the incidence surfaces 742a to 742e of the corresponding collimator lenses 73Aa to 73Ae are all substantially the same.

As with the light source array 700, the collimator lenses 73Aa to 73Ae of the light source array 700A are disposed so that apex portions 741 of the exit surfaces 741a to 741e (that is, optical axes of the collimator lenses 73Aa to 73Ae) substantially coincide with axes of lights in the blue wavelength range which are emitted from the corresponding blue laser diodes 71a to 71e.

The collimator lenses 73Aa, 73Ab which are situated on one side of the collimator lens 73Ac which is situated at the center of the light source array 700A and the collimator lenses 73Ad, 73Ae which are situated on the other side of the collimator lens 73Ac have substantially the same shape. However, the collimator lens 73Aa and the collimator lens 73Ae which are disposed in symmetrical positions and which constitute one and the other collimator lenses of an outermost pair may have different lengths, and the collimator lens 73Ab and the collimator lens 73d which are disposed in symmetrical positions and which constitute one and the other collimator lenses of another outer pair may have different lengths. Thus, the collimator lenses 73Aa, 73Ab, 73Ad, 73Ae can be disposed so that the distance g1a differs from the distance g1e and the distance g1b differs from the distance g1d.

Lights in the blue wavelength range which are emitted from the blue laser diodes 71c to 71e are shone onto the effective range S shown in FIG. 6 as with the light source array 700 shown in FIG. 5. Namely, the illuminated area s3 which is situated substantially at the center of the effective range S denotes an area onto which light in the blue wavelength range L3 which is emitted from the blue laser diode 71c shown in FIG. 7 is shone. The illuminated area s4 which is situated slightly outwards of the center of the effective range S denotes an area onto which light in the blue wavelength range L4 which is emitted from the blue laser diode 71d shown in FIG. 7 is shone. The illuminated area s5 which is situated in the corner of the effective range S denotes an area onto which light in the blue wavelength range L5 which is emitted from the blue laser diode 71e shown in FIG. 7 is shone.

Thus, as has been described heretofore, the light source unit 60 according to this embodiment is configured so that the incidence surfaces 742a to 742e of the collimator lenses 73Aa to 73Ae are disposed substantially on the same plane. Thus, since the distances g2a to g2e from the blue laser diodes 71 to the collimator lenses 73A can be made short and constant, the configuration of a fixing member of the collimator lenses 73A like the fixing holder 75 can be simplified.

Figure 8:
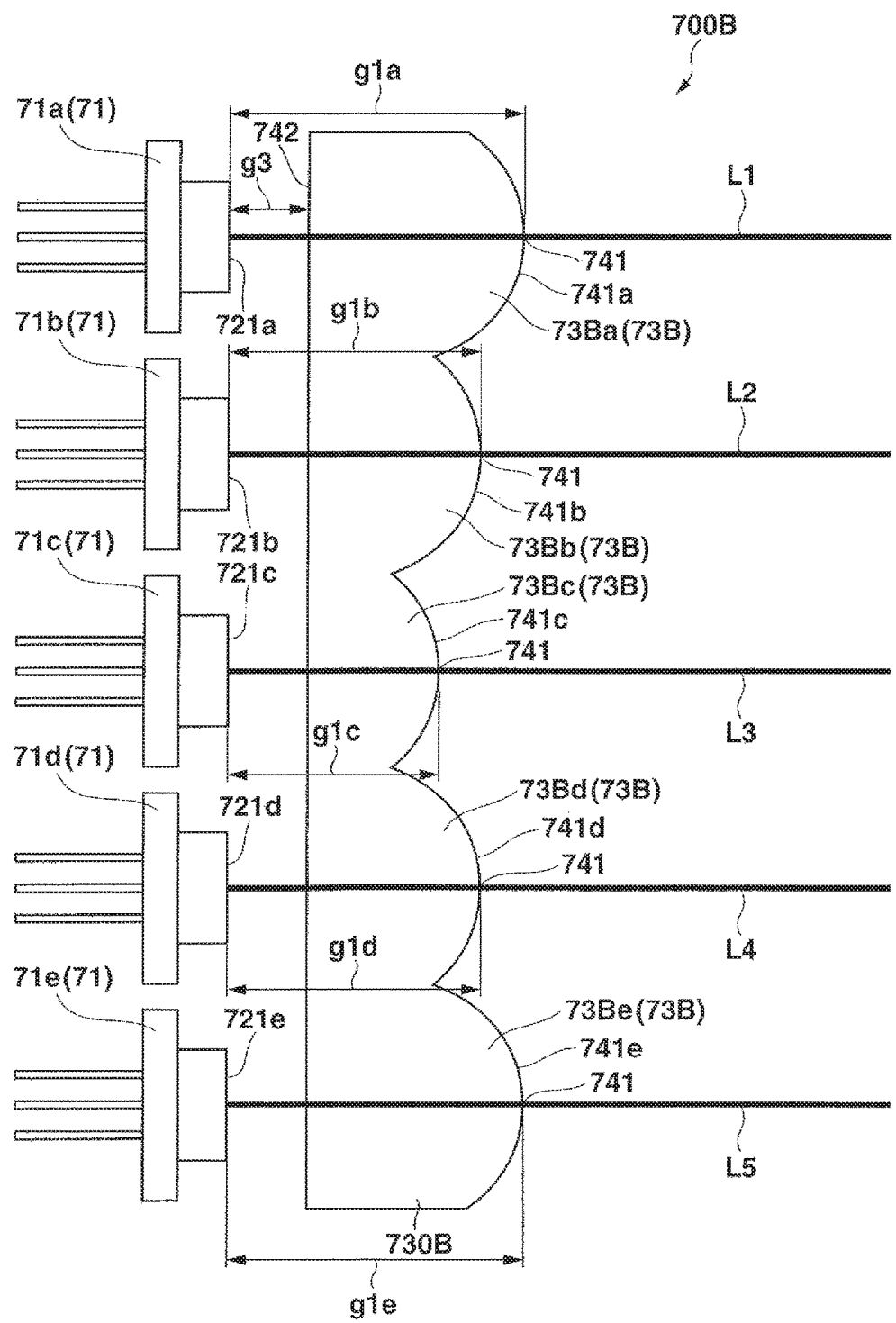
FIG. 8 is a schematic view showing a second modified example made to the light source array according to the invention.

Next, another modified example of the embodiment will be described. FIG. 8 is a schematic view showing a light source array 700B according to a second modified example. In the second modified example, a light source unit 60 includes collimator lenses 73Ba to 73Be (73B) which are formed into an integrated unit as a lens array 730B in place of the collimator lenses 73 of the light source array 700.

In the lens array 730B, an incidence surface 742 which lights in the blue wavelength range enter is formed as a flat surface. In addition, exit surfaces 741a to 741e of the collimator lenses 73Ba to 73Be from which lights in the blue wavelength range exit are formed as convex lenses.

As with the collimator lenses 73a to 73e of the light source array 700, the collimator lenses 73Ba to 73Be are formed so as to be longer in a direction in which lights in the blue wavelength range are emitted as they are arranged from a center (the collimator lens 73Bc) towards outer sides (the collimator lenses 73Ba, 73Be) of the whole of the light source array 700B.

Consequently, as with the light source array 700, the light source array 700B is configured so that a distance g1c between an exit surface 721c of a blue laser diode 71c which is situated at a center of the light source array 700B in relation to the direction of a row of blue laser diodes 71a to 71e and the exit surface 741c of the corresponding collimator lens (a first collimator lens) 73Bc is shorter than distances g1a, g1b, g1d, g1e between exit surfaces 721a, 721b, 721d, 721e of the blue laser diodes 71a, 71b, 71d, 71e which are disposed on outer sides of the light source array 700B and the exit surfaces 741a, 741b, 741d, 741e of the corresponding collimator lenses (second collimator lenses) 73Ba, 73Bb, 73Bd, 73Be. In addition, distances g3 from the exit surfaces 721a to 721e of the blue laser diodes 71a to 71e to the incidence surface 742 of the lens array 730B are the same.

As with the light source array 700, the exit surfaces 741a to 741e of the light source array 700B are disposed so that apex portions 741 (that is, optical axes of the collimator lenses 73Ba to 73Be) substantially coincide with axes of lights in the blue wavelength range which are emitted from the corresponding blue laser diodes 71a to 71e.

The collimator lens 73Ba situated on one side of the central collimator lens 73Bc and the collimator lens 73Be situated on the other side of the central collimator lens 73Bc have substantially the same shape, and the collimator lens 73Bb situated on the one side of the collimator lens 73Bc and the collimator lens 73Bd situated on the other side of the collimator lens 73Bc have substantially the same shape. However, the second modified example is not limited thereto. For example, the collimator lens 73Ba and the collimator lens 73Be which make a pair may have different lengths, and the collimator lens 73Bb and the collimator lens 73Bd which make another pair may have different lengths. Thus, the collimator lenses 73Ba, 73Bb, 73Bd, 73Be which are situated on the outer sides of the lens array 730B can be formed so that the distance g1a differs from the distance g1e and the distance g1b differs from the distance g1d.

As with the first embodiment, lights in the blue wavelength range which are emitted from the blue laser diodes 71a to 71e are shone onto the effective range S shown in FIG. 6. Namely, the illuminated area s3 which is situated substantially at the center of the effective range S denotes an area onto which light in the blue wavelength range L3 which is emitted from the blue laser diode 71c shown in FIG. 8 is shone. The illuminated area s4 which is situated slightly outwards of the center of the effective range S denotes an area onto which light in the blue wavelength range L4 which is emitted from the blue laser diode 71d shown in FIG. 8 is shone. The illuminated area s5 which is situated in the corner of the effective range S denotes an area onto which light in the blue wavelength range L5 which is emitted from the blue laser diode 71e shown in FIG. 8 is shone.

Thus, as has been described heretofore, the collimator lenses 73Ba to 73Be of the light source unit 60 of this embodiment are formed integral as the lens array 730B. Consequently, the plurality of collimator lenses each having a light collecting function can be adjusted as a unit, whereby the collimator lenses can easily be mounted on a fixing portion like the fixing holder 75 or the like.

Second Embodiment

Figure 9:
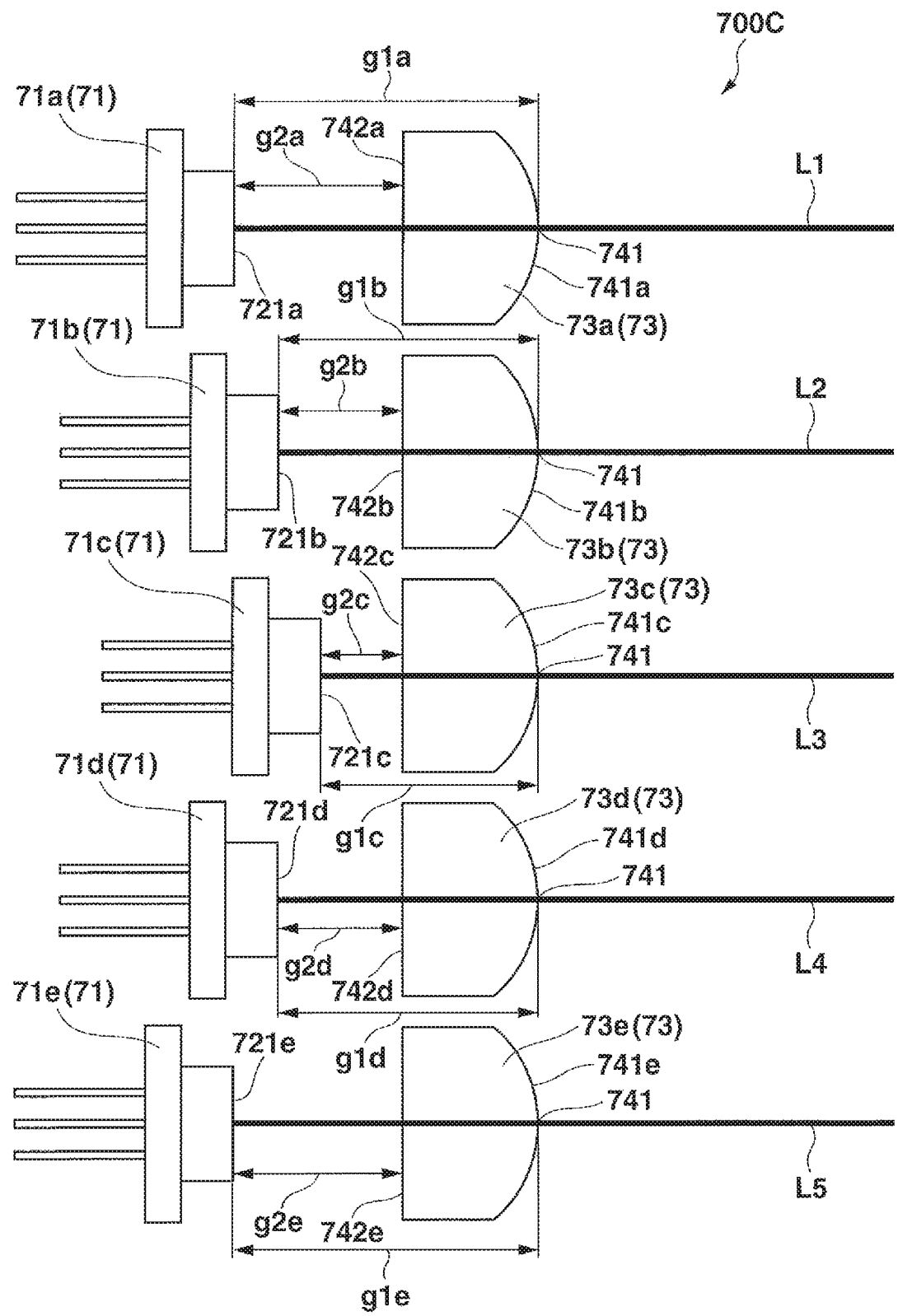
FIG. 9 is a schematic view showing a light source array according to a second embodiment of the invention.

Next, a second embodiment of the invention will be described. FIG. 9 is a schematic view showing a light source array 700C. Blue laser diodes 71 and collimator lenses 73 of the light source array 700C are disposed differently from the blue laser diodes 71 and the collimator lenses 73 of the light source array 700 of the first embodiment. In the description of the light source array 700C of the second embodiment, configurations similar to those of the light source array 700 of the first embodiment will not be described or will be described simply.

The collimator lenses 73a to 73e have substantially the same shape and are disposed so that incidence surfaces 742a to 742e thereof are disposed substantially on the same plane. Thus, exit surfaces 741a to 741e of the collimator lenses 73a to 73e are also situated substantially on the same plane.

The blue laser diodes 71a to 71e are disposed so that the blue laser diodes 71a to 71e are situated farther away from the incidence surfaces 742a to 742e of the corresponding collimator lenses 73a to 73e as they are arranged to be farther away from a center (the blue laser diode 71c) towards outer sides (the blue laser diodes 71a, 71e) of the light source array 700C along the direction of the row of blue laser diodes 71a to 71e. Consequently, the blue laser diode (a first semiconductor light emitting device) 71c which is situated at the center of the light source array 700C is disposed so that its exit surface (a first exit surface) 721c is situated further forwards than exit surfaces (third exit surfaces) 721a, 721b, 721d, 721e of the outer blue laser diodes (second semiconductor light emitting devices) 71a, 71b, 71d, 71e.

Due to this, the light source array 700C of this embodiment is configured so that distances g2a to g2e between the incidence surfaces 742a to 742e of the collimator lenses 73a to 73e and the exit surfaces 721a to 721e of the blue laser diodes 71a to 71e become longer as the blue laser diodes 71a to 71e are arranged so as to be farther away towards the outer sides of the light source array 700C. In addition, the light source array 700C is configured so that distances g1a to g1e between exit surfaces 741a to 741e of the collimator lenses 73a to 73e and the exit surfaces 721a to 721e of the blue laser diodes 71a to 71e become longer as the blue laser diodes 71a to 71e are arranged so as to be farther away towards the outer sides of the light source array 700C.

As with the light source array 700, the collimator lenses 73a to 73e are disposed so that apex portions 741 of the exit surfaces 741a to 741e (that is, optical axes of the collimator lenses 73a to 73e) substantially coincide with axes of lights in the blue wavelength range which are emitted from the corresponding blue laser diodes 71a to 71e.

In FIG. 5, the blue laser diodes 71a, 71b which are disposed on one side of the central blue laser diode 71c and the blue laser diodes 71d, 71e which are disposed on the other side of the central blue laser diode 71c are disposed in the symmetrical positions with respect to the central blue laser diode 71c. However, the blue laser diodes 71a, 71b, 71d, 71e can also be disposed so that the distance g1a differs from the distance g1e and the distance g1b also differs from the distance g1d.

Lights in the blue wavelength range are emitted from the blue laser diodes 71a to 71e substantially as parallel lights having a predetermined width. However, there may be a situation in which the lights so emitted contain a component of diffuse light having a slight diffusing angle. As this occurs, widths of pencils of light in the blue wavelength range in positions situated on the exit surfaces 741a to 741e of the collimator lenses 73a to 73e become greater as the distances g1a to g1e between the exit surfaces 721a to 721e of the blue laser diodes 71a to 71e and the corresponding collimator lenses 73a to 73e become longer.

Consequently, for example, the collimator lens 73c is disposed so that a focal position of a light in the blue wavelength range which is emitted from the blue laser diode 71c which emits a pencil of light of a smallest width lies near an illuminated area of the fluorescence light emitting area 103 or the diffuse transmission area 104. Then, being different from those shown in FIG. 6, areas of illuminated areas s3 to s5 are formed wider sequentially in the order of the illuminated area s3 of the blue laser diode 71c, the illuminated area s4 of the blue laser diode 71d and the illuminated area s5 of the blue laser diode 71e. The light whose intensity distribution differs from that of the light described in the first embodiment can be emitted from the fluorescence plate 101 as excitation light.

Thus, as has been described heretofore, in the light source unit 60 of this embodiment, the collimator lenses 73a to 73e are disposed so that the exit surfaces 741a to 741e are situated substantially on the same plane. In addition, the distances g1a to g1e from the exit surfaces 721a to 721e of the blue laser diodes 71a to 71e to the exit surfaces 741a to 741e of the collimator lenses 73a to 73e are made to differ. Thus, even in the event that lights in the blue wavelength range which are emitted from the blue laser diodes 71a to 71e contain the component of diffuse light, the illuminated area on the effective range S can be set to an appropriate size by determining the positions of the blue laser diodes 71a to 71e accordingly. Thus, the light whose intensity is distributed uniformly can be shone onto the effective range S as a whole as excitation light.

The blue laser diodes 71a to 71e can be disposed so as to be situated closer to the incidence surfaces 742a to 742e of the collimator lenses 73a to 73e as they are arranged so as to be farther away from the center (the blue laser diode 71c) towards the outer sides (the blue laser diodes 71a, 71e) of the light source array 700C along the direction of the row of blue laser diodes 71a to 71e. Namely, the blue laser diode 71c which is situated at the center of the light source array 700C can be disposed so that the exit surface 721c thereof is situated rearwards of the exit surfaces 721a, 721b, 721d, 721e of the outer blue laser diodes 71a, 71b, 71d, 71e. As this occurs, an illuminated area of lights in the blue wavelength range which are shone onto the vicinity of the center of the effective range S becomes wide, while an illuminated area of lights in the blue wavelength range which are shone onto an end portion or a corner portion of the effective range S becomes narrow. Thus, the light whose intensity is distributed uniformly can be shone onto the effective range S as a whole as excitation light.

The configuration of the first embodiment may be combined with the configuration of the second embodiment. Namely, the positions of the blue laser diodes 71a to 71e and the positions of the collimator lenses 73a to 73e may be shifted in the emitting direction of light in the blue wavelength range so as to control the positions where lights in the blue wavelength range are collected individually or the widths of pencils of light in the blue wavelength range.

In the embodiments that have been described heretofore, the collimator lenses 73, 73A, 73B or the apex portions 741 thereof may be configured so as to coincide substantially with axes of lights in the blue wavelength range which are emitted from the corresponding blue laser diodes. As this occurs, the outer blue laser diodes 71 may be mounted while being inclined so that lights in the blue wavelength range emitted therefrom are collected. In addition, in FIG. 3, the reflecting mirror 76 is illustrated as a plate-shaped integral member. However, a plurality of slip-shaped reflecting mirrors may be disposed so as to correspond individually to the blue laser diodes 71.

In addition, biconvex lenses may be used for the collimator lenses 73 which correspond to the blue laser diodes 71.

The exit surfaces 741a to 741e of the collimator lenses 73, 73A, 73B may have different radii of curvature, sizes and shapes. For example, the curvature of the exit surface 741c of the central collimator lens 73c, 73Ac, 73Bc can be different from those of the exit surfaces 741a, 741e of the outer collimator lenses 73a, 73Aa, 73Ba, 73e, 73Ae, 73Be. Thus, the widths of pencils of light in the blue wavelength range and the positions where those pencils of light in the blue wavelength range are collected can be made to differ for each of the blue laser diodes 71a to 71e so as to control the shapes of the illuminated areas.

Thus, light whose intensity is disturbed uniformly can be shone onto the effective range S as a whole as excitation light by controlling individually the widths of pencils of light in the blue wavelength range which are emitted from the blue laser diodes 71a to 71e and the positions where the pencils of light in the blue wavelength range so emitted are collected.

In the event that light emitted from the central blue laser diode 71c is expanded, the blue laser diodes 71 and the collimator lenses 73, 73A, 73B can be disposed so that lights emitted from the outer blue laser diodes 71a, 71b, 71d, 71e become parallel lights. In addition, in the event that a light emitted from the central blue laser diode 71c is a parallel light, the blue laser diodes 71 and the collimator lenses 73, 73A, 73B can be disposed so that lights emitted from the outer blue laser diodes 71a, 71b, 71d, 71e are converged towards the effective range S.

In the embodiments, the blue laser diodes 71 are arranged into the matrix configuration of three rows and five columns. However, the blue laser diodes 71 can be arranged into a matrix configuration of an arbitrary number of rows and an arbitrary number of columns or can be arranged differently.

In addition, in FIG. 5, the outer collimator lenses 73a, 73b, 73d, 73e of the light source array 700 can be disposed so that the apex portions 741 of the exit surfaces 741a, 741b, 741d, 741e (that is, the optical axes of the collimator lenses) are shifted so as to be closer to the central collimator lens 73c than axes of lights in the blue wavelength range which are emitted from the corresponding blue laser diodes 71a, 71b, 71d, 71e. The shifting amount of the collimator lenses 73b, 73d is made smaller than the shifting amount of the outer collimator lenses 73a, 73e. Namely, the shifting amount of the pairs of blue laser diode 71 and collimator lens 73 which are disposed relatively outwards can be made greater than the shifting amount of the pairs of blue laser diode 71 and collimator lens 73 which are disposed relatively inwards of the light source array 700.

By disposing the outer collimator lenses 73a, 73b, 73d, 73e so as to be shifted towards the center of the light source array 700 along the direction of the row of collimator lenses 73a to 73e in the way described above, lights in the blue wavelength range which are emitted from the blue laser diodes 71a, 71e, 71b, 71d which are disposed on the outer sides of the light source array 700 can be refracted to be collected towards a center of a whole of pencils of light of the light source array 700.

Consequently, in the event that the positions of the collimator lenses 73a, 73b, 73d, 73e are deflected from the positions of the blue laser diodes 71a, 71b, 71d, 71e, although the shapes of the illuminated areas s4, s5 tend to be distorted easily, lights in the blue wavelength range which are shone onto the outside of the effective range S can be reduced by changing the sizes of the illuminated areas s4, s5. The light source arrays 700A to 700C can also be configured similarly.

In the embodiment, the collimator lenses 73, 73A, 73B are described as being shifted relative to the blue laser diodes 71 as the collimator lenses 73, 73A, 73B are arranged from the outer sides towards the center of the light source array 700, 700A, 700B along the direction of the row of collimator lenses as seen from the top thereof. However, the invention is not limited thereto. The collimator lenses 73, 73A, 73B which are disposed on the outer sides of the light source array 700, 700A to 700C may be disposed so that the apex portions 741 of the exit surfaces 741a to 741e (that is, the optical axes of the collimator lenses 73, 73A, 73B) thereof are similarly sifted towards the central collimator lens 73, 73A, 73B so as to be closer thereto than axes of lights in the blue wavelength range which are emitted from the corresponding blue laser diodes 71 along the direction of columns of collimator lenses 73, 73A, 73B.

Thus, as has been described heretofore, with the light source unit 60 in which the degree at which the light in the blue wavelength range which is emitted from the central laser diodes 71c is collected to the illuminated surface of the fluorescence plate 101 differs from the degree at which the lights in the blue wavelength range which are emitted from the outer blue laser diodes 71*a*, 71*b*, 71*d*, 71*e* are collected on to the same illuminated surface, the lights in the blue wavelength range can be shone onto the effective range S of the fluorescence light emitting area 103 with the uniform intensity distribution.

In addition, with the light source unit 60, lights in the blue wavelength range can uniformly be collected to the inside of the effective range S of the fluorescence light emitting area 103 or the diffuse transmission area 104 by changing the distances between the collimator lenses 73 and the corresponding blue laser diodes 71 for each of the positions of the blue laser diodes 71.

In addition, the thicknesses and focal positions of pencils of light in the blue wavelength range can be determined for each of the blue laser diodes 71 by changing the distances of the collimator lenses 73 and the blue laser diodes 71. Then, the light in the blue wavelength range which is shone onto the position on the effective range S on the fluorescence material which is situated away from the center thereof is controlled to form the small illuminated shape or area while the light in the blue wavelength range which is shone onto the position on the effective range S which is situated near the center thereof is controlled to form the great illuminated shape or area, whereby not only can the illuminated intensity be prevented from being enhanced locally within the effective range but also the lights in the blue wavelength range can be collected to the inside of the effective range.

In addition, with the light source unit 60 in which the exit surface 741*c* of the collimator lens 73*c* is situated further rearwards than the exit surfaces 741*a*, 741*e* of the collimator lenses 73*a*, 73*e*, the size of the illuminated area within the effective range S can be controlled by changing the light collecting position for each of the blue laser diodes 71*a*, 71*c*, 71*e*.

Additionally, with the light source unit 60 in which the exit surface 721*c* of the first semiconductor light emitting device (the blue laser diode 71*c*) and the exit surfaces 721*a*, 721*e* of the second semiconductor light emitting devices (the blue laser diodes 71*a*, 71*e*) are disposed on the same plane, the configuration of the fixing member which fixes the blue laser diodes 71*a*, 71*c*, 71*e* in place can be simplified.

With the light source unit 60 in which the outer collimator lenses 73*a*, 73*e* are formed longer than the central collimator lens 73*c* in the light emitting direction, the mounting of the collimator lenses 73*a*, 73*c*, 73*e* can be dealt with flexibly to the shape of the fixing member.

In addition, with the light source unit 60 in which the incidence surface 742*c* of the collimator lens 73*c* and the incidence surfaces 742*a*, 742*e* of the collimator lenses 73*a*, 73*e* are situated on the same plane, the configuration of the fixing member which fixes the collimator lenses 73*a*, 73*c*, 73*e* in place can be made simple.

Additionally, with the light source unit 60 in which the apex portions 741 of the exit surfaces 741*a*, 741*e* of the collimator lenses 73*a*, 73*e* are disposed so as to lie closer to the collimator lens 73*c* than the axes of the lights in the blue wavelength range which are emitted from the corresponding second semiconductor light emitting devices (the blue laser diodes 71*a*, 71*e*), the plurality of lights in the blue wavelength range can be guided so as to be collected without changing the mounting angles of the blue laser diodes 71*a*, 71*e*.

The light source unit 60 which includes the red light source device 120 which emits light in the red wavelength range and in which fluorescence light is light in the green wavelength range and the first and second semiconductor light emitting devices (the blue laser diodes 71*a* to 71*e*) emit lights in the blue wavelength range or lights functioning as excitation light can be made to function as a light source for three primary colors which make up a color image.

In addition, with the light source unit 60 in which the first and second semiconductor light emitting devices (the blue laser diodes 71*a* to 71*e*) emit lights in the blue wavelength range onto the inside of the effective range S of the fluorescence light emitting area 103 of the fluorescence plate 101, lights emitted by the first and second semiconductor light emitting devices can be made use of as excitation light with good efficiency.

In the embodiments, the distance between the first exit surface (the exit surface 721) of the first semiconductor light emitting device (the blue laser diode 71*c*) and the second exit surface (the exit surface 741*c*) of the first collimator lens (the collimator lens 73*c*, 73A*c*, 73B*c*) which is disposed so as to correspond to the first semiconductor light emitting device differs from the distances between the third exit surfaces (the exit surfaces 721*a*, 721*e*) of the second semiconductor light emitting devices (the blue laser diodes 71*a*, 71*e*) which are disposed further outwards than the first semiconductor light emitting device and the fourth exit surfaces (the exit surfaces 741*a*, 741*e*) of the second collimator lenses (the collimator lenses 73*a*, 73A*a*, 73B*a*, 73*e*, 73A*e*, 73B*e*) which are disposed so as to correspond to the corresponding second semiconductor light emitting devices. However, as shown in FIG. 6, the degree at which light is collected onto the illuminated surface (for example, the collection density, the collecting area) should be made to differ on the outer side and at the center of the illuminated surface, and hence, the invention is not limited to the configuration described above. Specifically, the curvatures of the collimator lenses 73, 73A, 73B should be changed on the collimator lenses which are disposed on the outer sides and on the collimator lens which is disposed at the center of the light source array. The curvature of the collimator lens 73*c*, 73A*c*, 73B*c* which is disposed at the center is made greater than the curvatures of the collimator lenses 73*a*, 73A*a*, 73B*a*, 73*e*, 73A*e*, 73B*e*) which are disposed on the outer sides of the light source array, whereby the degree at which light is collected at the center is made weaker to strengthen relatively the degree at which light is collected on the outer side of the illuminated surface, thereby making it possible to cause light which is attempted to be shone onto the outside of the illuminated surface to be converged onto the inside of the illuminated area of the illuminated surface.

The degree at which light in the blue wavelength range which is emitted from the blue laser diode 71*c* which is situated at the center is collected onto the illuminated surface differs from the degrees at which lights in the blue wavelength range which are emitted from the blue laser diodes 71*a*, 71*b*, 71*d*, 71*e* which are situated on the outer sides of the light source array are collected onto the illuminated surface. However, this illuminated surface may be either the fluorescence light emitting area 103 which receives light in the blue wavelength range as excitation light to emit fluorescence light or the diffuse transmission area 104 which receives light in the blue wavelength range to transmit the light while diffusing it.

The embodiments that have been described heretofore are presented as examples and are hence not intended at all to limit the scope of the invention. The novel embodiments can be carried out in other various forms, and hence, various omissions, replacements and modifications can be made thereto without departing from the sprit and scope of the invention. The embodiments and their modifications are included not only in the spirit and scope of the invention but also in the scope of inventions which are claimed through claims and their equivalents.

What is claimed is:

1. A light source unit comprising:
   a first semiconductor light emitting device which is disposed centrally and a second semiconductor light emitting device which is disposed outwards of the first semiconductor light emitting device, the first semiconductor light emitting device and the second semiconductor light emitting device emitting lights; and
   a first collimator lens which is disposed centrally and a second collimator lens which is disposed outwards of the first collimator lens, the first collimator lens and the second collimator lens being disposed so as to correspond to the first semiconductor light emitting device and the second semiconductor light emitting device, respectively, on sides of the first semiconductor light emitting device and the second semiconductor light emitting device from which the lights are emitted, wherein
   a degree at which the light of the first semiconductor light emitting device is collected onto an illuminated surface differs from a degree at which the light of the second semiconductor light emitting device is collected onto the illuminated surface.

2. The light source unit according to claim 1, wherein the illuminated surface includes either a fluorescence light emitting area which receives the lights as excitation light to thereby emit fluorescence light or a diffuse transmission area which receives the lights to thereby emit the lights while diffusing them.

3. The light source unit according to claim 2, comprising:
   a red light source device which emits light in a red wavelength range, wherein
   the fluorescence light is light in a green wavelength range, and wherein
   the first semiconductor light emitting device and the second semiconductor light emitting device emits the lights as lights in a blue wavelength range or as the excitation light.

4. The light source unit according to claim 2, comprising further:
   a fluorescence plate on which the fluorescence light emitting area is provided, wherein
   the first semiconductor light emitting device and the second semiconductor light emitting device emit the lights onto an inside of an effective range of the fluorescence light emitting area on the fluorescence plate.

5. The light source unit according to claim 3, comprising further:
   a fluorescence plate on which the fluorescence light emitting area is provided, wherein
   the first semiconductor light emitting device and the second semiconductor light emitting device emit the lights onto an inside of an effective range of the fluorescence light emitting area on the fluorescence plate.

6. The light source unit according to claim 1, wherein
   a distance between a first exit surface of the first semiconductor light emitting device and a second exit surface of the first collimator lens differs from a distance between a third exit surface of the second semiconductor light emitting device and a fourth exit surface of the second collimator lens.

7. The light source unit according to claim 2, wherein
   a distance between a first exit surface of the first semiconductor light emitting device and a second exit surface of the first collimator lens differs from a distance between a third exit surface of the second semiconductor light emitting device and a fourth exit surface of the second collimator lens.

8. The light source unit according to claim 3, wherein
   a distance between a first exit surface of the first semiconductor light emitting device and a second exit surface of the first collimator lens differs from a distance between a third exit surface of the second semiconductor light emitting device and a fourth exit surface of the second collimator lens.

9. The light source unit according to claim 5, wherein
   a distance between a first exit surface of the first semiconductor light emitting device and a second exit surface of the first collimator lens differs from a distance between a third exit surface of the second semiconductor light emitting device and a fourth exit surface of the second collimator lens.

10. The light source unit according to claim 1, wherein
    a curvature of the second exit surface of the first collimator lens differs from a curvature of the fourth exit surface of the second collimator lens.

11. The light source unit according to claim 2, wherein
    a curvature of the second exit surface of the first collimator lens differs from a curvature of the fourth exit surface of the second collimator lens.

12. The light source unit according to claim 3, wherein
    a curvature of the second exit surface of the first collimator lens differs from a curvature of the fourth exit surface of the second collimator lens.

13. The light source unit according to claim 6, wherein
    the first collimator lens and the second collimator lens are disposed so that the second exit surface of the first collimator lens is situated further rearwards than the fourth exit surface of the second collimator lens.

14. The light source unit according to claim 6, wherein
    the first semiconductor light emitting device and the second semiconductor light emitting device are disposed so that the first exit surface of the first semiconductor light emitting device and the third exit surface of the second semiconductor light emitting device are situated on the same plane.

15. The light source unit according to claim 6, wherein
    the second collimator lens is formed longer than the first collimator lens in a direction in which the lights are emitted.

16. The light source unit according to claim 6, wherein
    the first collimator lens and the second collimator lens are formed integrally as a lens array.

17. The light source unit according to claim 6, wherein
    the first collimator lens and the second collimator lens are disposed so that the second exit surface of the first collimator lens and the fourth exit surface of the second collimator lens are situated on the same plane, and wherein
    the first semiconductor light emitting device and the second semiconductor light emitting device are disposed so that the first exit surface of the first semiconductor light emitting device is disposed further forwards than the third exit surface of the second semiconductor light emitting device.

18. The light source unit according to claim 15, wherein
    an incidence surface of the first collimator lens is situated on the same plane as a plane on which an incidence surface of the second collimator lens is situated.

19. The light source unit according to claim 6, wherein the second collimator lens is disposed so that an apex portion of the fourth exit surface of the second collimator lens is situated closer to the first collimator lens than an axis of the light which is emitted from the corresponding second semiconductor light emitting device.

20. A projector comprising:
the light source unit according to claim 1;
a display device onto which light source light is shone from the light source unit to thereby form image light;
a projection-side optical system which projects the image light emitted from the display device onto a screen; and
a projector control unit which controls the display device and the light source unit.

\* \* \* \* \*